March 19, 1940.   P. B. ROISUM   2,194,234
TOOL
Filed Aug. 10, 1939   3 Sheets-Sheet 2
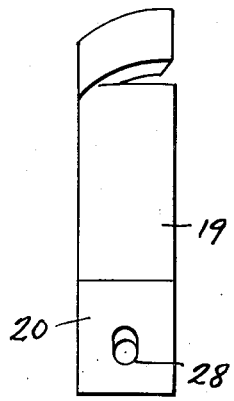
Fig. 5.
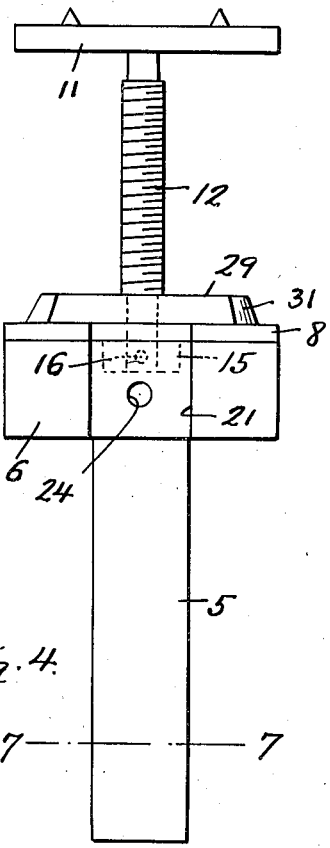
Fig. 4.
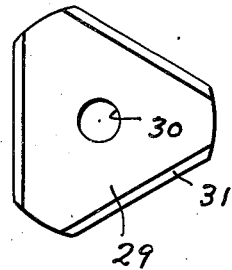
Fig. 6.
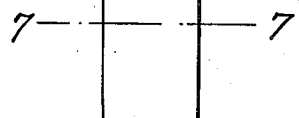
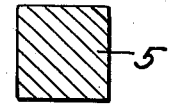
Fig. 7.
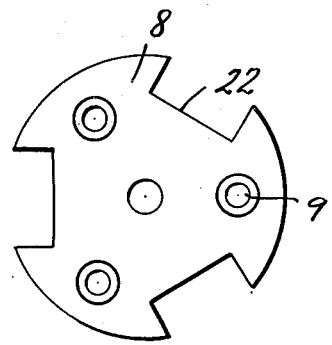
Fig. 8.
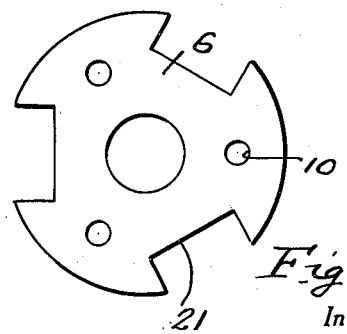
Fig. 9.
Inventor
Palmer B. Roisum
By Clarence A. O'Brien
and Hyman Berman
Attorneys March 19, 1940.  P. B. ROISUM  2,194,234
TOOL
Filed Aug. 10, 1939   3 Sheets-Sheet 3
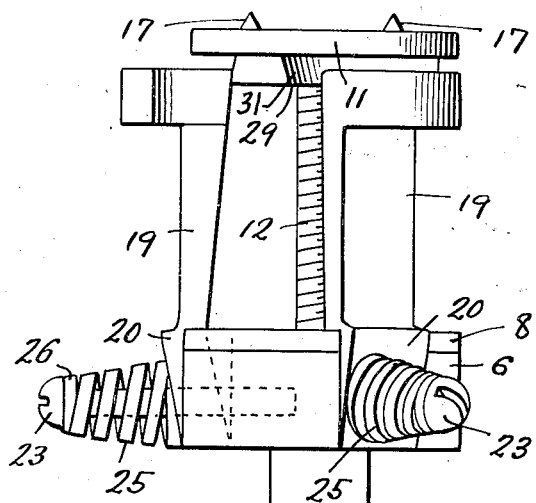
Fig. 10.
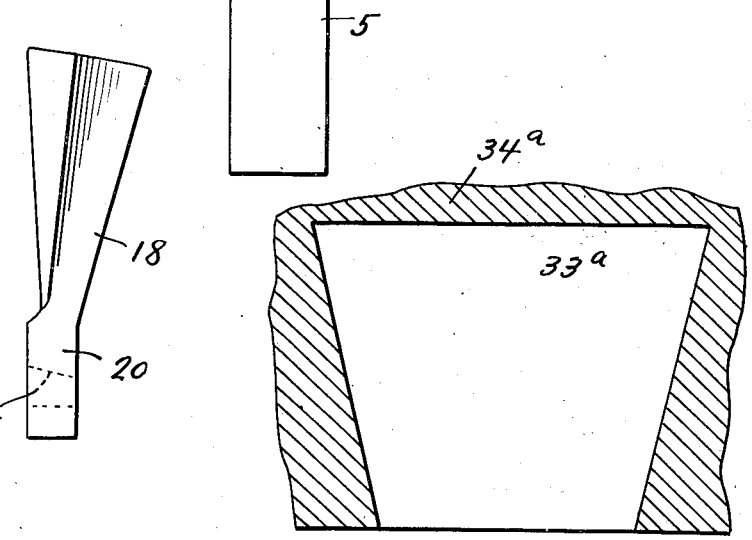
Fig. 11.
Fig. 12.
Fig. 13.
Inventor
Palmer B. Roisum
By 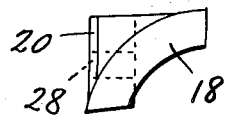
Attorneys Patented Mar. 19, 1940

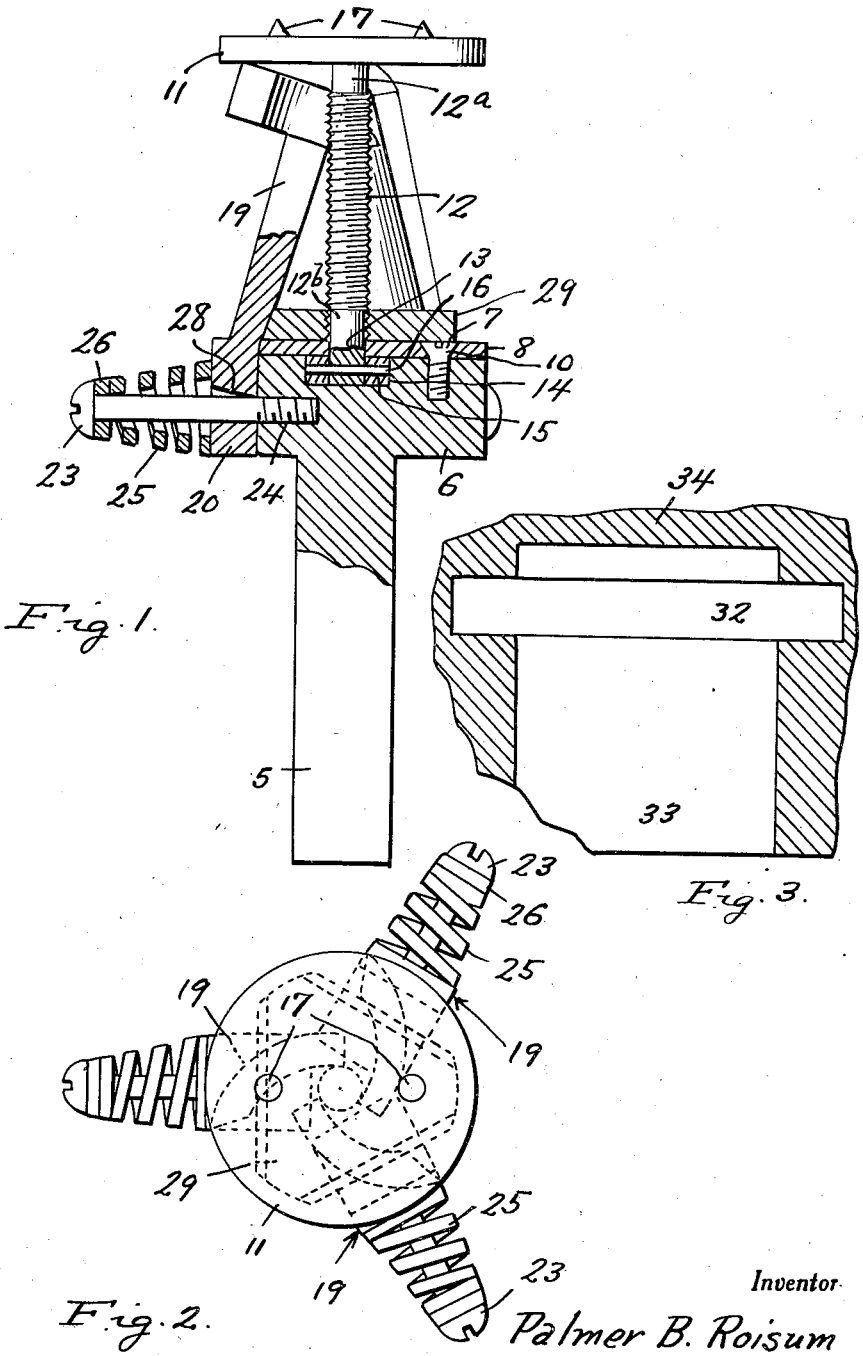

2,194,234

UNITED STATES PATENT OFFICE 2,194,234

TOOL

Palmer B. Roisum, Elkins Park, Pa.

Application August 10, 1939, Serial No. 289,470

6 Claims. (Cl. 77—58)

This invention relates to tools and more particularly to tools for boring and grooving.

An object of the present invention is to provide an expanding tool particularly designed for changing the bore of a previously formed hole or recess and also designed for forming a groove in the wall of a previously bored hole or recess; and the invention, together with its objects and advantages will be best understood from a study of the following description taken in connection with the accompanying drawings wherein:

Figure 1 is a view partly in section and partly in elevation showing the tool ready for use.

Figure 2 is a top plan view of the tool.

Figure 3 is a fragmentary sectional view through the work showing a groove formed with the tool of the invention.

Figure 4 is an elevational view of the tool with the blades removed.

Figure 5 is an elevational view of a grooving blade.

Figure 6 is a plan view of an expander member.

Figure 7 is a sectional view taken substantially on the line 7—7 of Figure 4.

Figure 8 is a plan view of the notched disk forming part of the invention.

Figure 9 is a plan view of a head equipped shank forming part of the invention.

Figure 10 is an elevational view of the tool with blades thereof in an expanded or cutting position.

Figure 11 is a side elevational view of a cutting blade.

Figure 12 is a top plan view of the cutting blade shown in Figure 11.

Figure 13 is a fragmentary sectional view through the work showing a hole the bore of which has been changed through the medium of the tool of the invention.

Referring more in detail to the drawings, it will be seen that the tool comprises a shank 5 that is rectangular, preferably, in cross section, as shown in Figure 7, and is equipped at one end with an enlarged circular head 6.

The head 6 is adapted to have removably secured thereon through the medium of screws 7, a plate 8. The plate 8 is provided with countersink openings 9 registering with threaded sockets 10 in the head 6 for accommodating the aforementioned screws 7.

A pilot disk or head 11 is provided at one end of a screw 12 that has a non-threaded end portion 12b accommodated within a recess 14 provided in the head, 6. On the end 12b of the screw 12 is secured a collar 15 though the medium of a pin 16. The collar 15 is confined within the recess 14 through the medium of the aforementioned plate 8, as clearly shown in Figure 4; this arrangement providing for rotative movement of the head 6 relative to the screw 12.

Th pilot disk 11 is provided on the leading face thereof with prongs or other suitable elements 17 to engage the work for securing the pilot head 11 and screw 12 against rotative movement when inserted in the hole or recess of the work.

Adapted to be mounted on the head 6 are bore-shaping blades 18, and in lieu thereof, and when such is desired, groove-forming blades 19.

Each of the blades 18 and 19 is provided with a base portion 20 adapted to be fitted within one of a series of notches 21 provided in the periphery of the head 6, and with which notches 21 register or align notches 22 in the plate 8.

The series of selected blades are mounted on the head 6 for pivotal movement radially with respect to the head 6 through the medium of elongated bolts 23 that have threaded free end portions threadedly engaging in radial sockets 24 provided in the head 6.

The portions 20 of the blades are held within the registering notches 21 and 22 through the medium of coil springs 25 provided on the bolts 23.

Each spring 25 is confined between a base 20 of a blade and a washer 26 interposed between the minor end of the conical spring and the head of the bolt, as clearly shown in Figure 1.

The blade equipped shanks of the respective blades 18 and 19 are set at a proper angle with regard to the portions 20 of the respective blades so that normally the cutting edges or surfaces of the blades are disposed inwardly of the peripheral edge of the pilot disk 11 as also clearly shown in Figure 1.

To permit proper inward and outward movement of the blades in the expanding and contracting of the tool each of the blades at the base 20 thereof has the opening 28 therein, accommodating the bolt 23, gradually increasing in diameter from one end to the opposite end thereof as shown.

For expanding the blades, that is, for forcing the blades outwardly against the action of the springs 25 into cutting engagement with the work, there is provided an expander plate 29 that is substantially triangular in plan and is provided with a central threaded aperture 30 for threaded engagement with thhe expander screw or threaded shank 12.

The plate 29 has the edges thereof beveled as at 31 to accommodate the shanks of the blades and is arranged on the screw or threaded shank 12 so as to engage the inner faces of the blade shanks as shown.

In actual practice it will be seen that to provide, for example, a groove 32 adjacent the inner end of an opening or recess 33 in work 34, the tool, equipped with the blades 19, and with the blades 19 in the contracted condition shown in Figure 1, is placed within the bore or recess and the prongs 17 thereof piercing the work so as to hold the head 11 against rotary movement within the recess. The operator then with a suitable handle, such as a handle for a drill or the like, applied to the shank 5, rotates the shank 5 and head 6 therewith. This rotative movement of the shank 5 and head 6 will be relative to the expander bolt or threaded shank 12 with the result that the threads in the opening 30 of the plate 29 will engage the threads of the screw 12, thus causing the plate 29 by reason of the engagement of the shanks of the blade with the edges of the plate 29 to move lengthwise on the screw 12 in the direction of the head 11. Obviously, as the expander plate 29 so moves on the screw 12 the blades 19 will be caused to pivot on the bolts 23 in a direction longitudinal to the bolts and radial to the head 6 so that the cutting ends of the blades 19 move into engagement with the wall of the recess 33, and as the tool continues to rotate, said blades will operate to cut the recess or groove 32.

In connection with the above it will be noted that at the end thereof adjacent to the head 11, the expander shank of screw 12 is provided with a non-threaded or smooth section 12a. When the expander plate 29 moves onto this section 12a of the screw 12 the tool operates freely and the operator then knows that the work of forming the groove 32 has been completed.

When such work has been completed the shank 5 with the head 6 is rotated in a reverse direction thus causing the expander plate 29 to move lengthwise of the screw 12 in the direction of the head 6, permitting the blades 19, in response to the springs 25, to return to the inward or contracted condition shown in Figure 1. Also in this connection it will be noted that adjacent the end thereof connected to the head 6, the screw 12 has the aforementioned non-threaded section 12b, and of course, when the plate 29 reaches this section 12b, of the screw 12, the tool will again work freely, and the operator then knows that the tool is in a fully contracted condition and may then easily remove the tool from the hole or recess 33.

Substantially the same operation is performed for changing the cylindrical bore of a recess 33a in work 34a to a substantially conical bore as shown in Figure 13; it being noted that in order to perform this work the blades 18 are substituted for the blades 19, the structure of the blades 18 being such that as the tool is rotated within the bore 33a and blades 18 expanded, said blades will serve to change the substantially cylindrical shape of the bore into a substantially conical shape, or into the shape shown in Figure 13.

It is thought that a clear understanding of the construction, utility, assembly, and advantages of a tool of this character will be had without a more detailed description.

Having thus described the invention, what is claimed as new is:

1. In a bore-shaping and groove-forming tool of the character described, a shank equipped at one end thereof with a fixed head, an expander screw swivelly connected at one end thereof with said fixed head, said expander screw at the opposite end thereof being provided with a pilot head, a plurality of blades pivoted, loosely, at one end thereof to the periphery of said fixed head and arranged in a substantially circular series thereon, yieldable means acting on said blades normally urging said blades to an inward position radially with respect to the periphery of said fixed head, an expander plate having threaded engagement with said screw and engaging the said blades for causing the latter to swing radially outwardly with respect to said fixed head as said plate moves lengthwise on the screw toward the pilot head of said screw, said expander plate being adapted to travel on said screw in response to rotative movement of said fixed head relative to said screw.

2. In a tool of the character described, a shank provided on one end thereof with a head, said head having a series of circumferentially spaced notches in the periphery thereof, bolts extending radially from said head and said notches, blades having apertured base portions engaging said bolts and seated within said notches, and springs mounted on said bolts and engaging the bases of said blades for yieldably urging said bases into said notches, and the blades having the apertures in the bases thereof accommodating said bolts tapered so as to permit swinging movement of said blades on the bolts radially inwardly and outwardly with respect to said head, and means mounted on said head and operable in response to rotative movement of the tool to cause said blades to swing radially outwardly relative to said head.

3. In a tool of the character described, a shank provided on one end thereof with a head, said head having a series of circumferentially spaced notches in the periphery thereof, bolts extending radially from said head and said notches, blades having apertured base portions engaging said bolts and seated within said notches, and springs mounted on said bolts and engaging the bases of said blades for yieldably urging said bases into said notches, and the blades having the apertures in the bases thereof accommodating said bolts tapered so as to permit swinging movement of said blades on the bolts radially inwardly and outwardly with respect to said head, and means mounted on said head and operable in response to rotative movement of the tool to cause said blades to swing radially outwardly relative to said head, said means including a screw swivelly connected at one end thereof with the head, at the center of said head, and an expander plate threadedly engaged with said screw to travel lengthwise thereof, said expander plate having tapered edge portions engaging said blades.

4. In a tool of the character described, a shank provided on one end thereof with a head, said head having a series of circumferentially spaced notches in the periphery thereof, bolts extending radially from said head and said notches, blades having apertured base portions engaging said bolts and seated within said notches, and springs mounted on said bolts and engaging the bases of said blades for yieldably urging said bases into said notches, and the blades having the apertures in the bases thereof accommodating said bolts tapered so as to permit swinging movement of said blades on the bolts radially inwardly and outwardly with respect to said head, and means mounted on said head and operable in response to rotative movement of the tool to cause said blades to swing radially outwardly relative to said head, said means including a screw swivelly connected at one end thereof with the head, at the center of said head, and an expander plate threadedly engaged with said screw to travel lengthwise thereof, said expander plate having tapered edge portions engaging said blades, said screw being provided adjacent opposite ends thereof with smooth non-threaded portions as and for the purpose specified.

5. In a tool of the character described, a shank provided on one end thereof with a head, said head having a series of circumferentially spaced notches in the periphery thereof, bolts extending radially from said head and said notches, blades having apertured base portions engaging said bolts and seated within said notches, and springs mounted on said bolts and engaging the bases of said blades for yieldably urging said bases into said notches, and the blades having the apertures in the bases thereof accommodating said bolts tapered so as to permit swinging movement of said blades on the bolts radially inwardly and outwardly with respect to said head, and means mounted on said head and operable in response to rotative movement of the tool to cause said blades to swing radially outwardly relative to said head, said means including a screw swivelly connected at one end thereof with the head, at the center of said head, and an expander plate threadedly engaged with said screw to travel lengthwise thereof, said expander plate having tapered edge portions engaging said blades, said screw being provided adjacent opposite ends thereof with smooth non-threaded portions to accommodate said expander plate when the latter reaches the limit of its movement at either extremity of the screw; said shank and blade equipped head being rotatable relative to the screw to cause traveling of said expander plate lengthwise of the screw.

6. In a tool of the character described, a shank provided on one end thereof with a head, said head having a series of circumferentially spaced notches in the periphery thereof, bolts extending radially from said head and said notches, blades having apertured base portions engaging said bolts and seated within said notches, and springs mounted on said bolts and engaging the bases of said blades for yieldably urging said bases into said notches, and the blades having the apertures in the bases thereof accommodating said bolts tapered so as to permit swinging movement of said blades on the bolts radially inwardly and outwardly with respect to said head, and means mounted on said head and operable in response to rotative movement of the tool to cause said blades to swing radially outwardly relative to said head, said means including a screw swivelly connected at one end thereof with the head, at the center of said head, and an expander plate threadedly engaged with said screw to travel lengthwise thereof, said expander plate having tapered edge portions engaging said blades, said screw being provided adjacent opposite ends thereof with smooth non-threaded portions to accommodate said expander plate when the latter reaches the limit of its movement at either extremity of the screw; said shank and blade equipped head being rotatable relative to the screw to cause traveling of said expander plate lengthwise of the screw, and a pilot head on the free end of said screw and equipped with means for engaging the work whereby to hold said pilot head and screw in fixed position relative to the work and as said shank and blade equipped head is rotated in either direction relative to said screw.

PALMER B. ROISUM.